Figure 7:
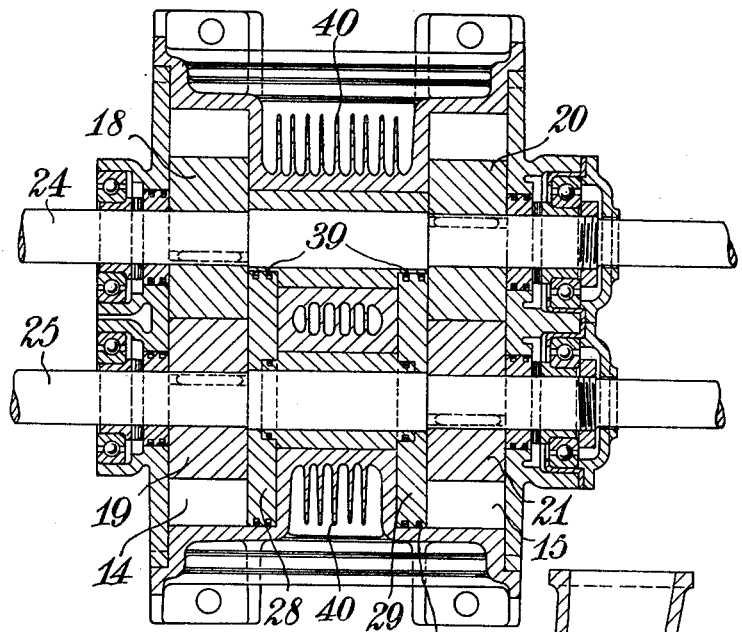

Oct. 27, 1936.  A. J. NORTHEY  2,058,817
ROTARY INTERNAL COMBUSTION ENGINE
Filed Dec. 22, 1932  5 Sheets-Sheet 1
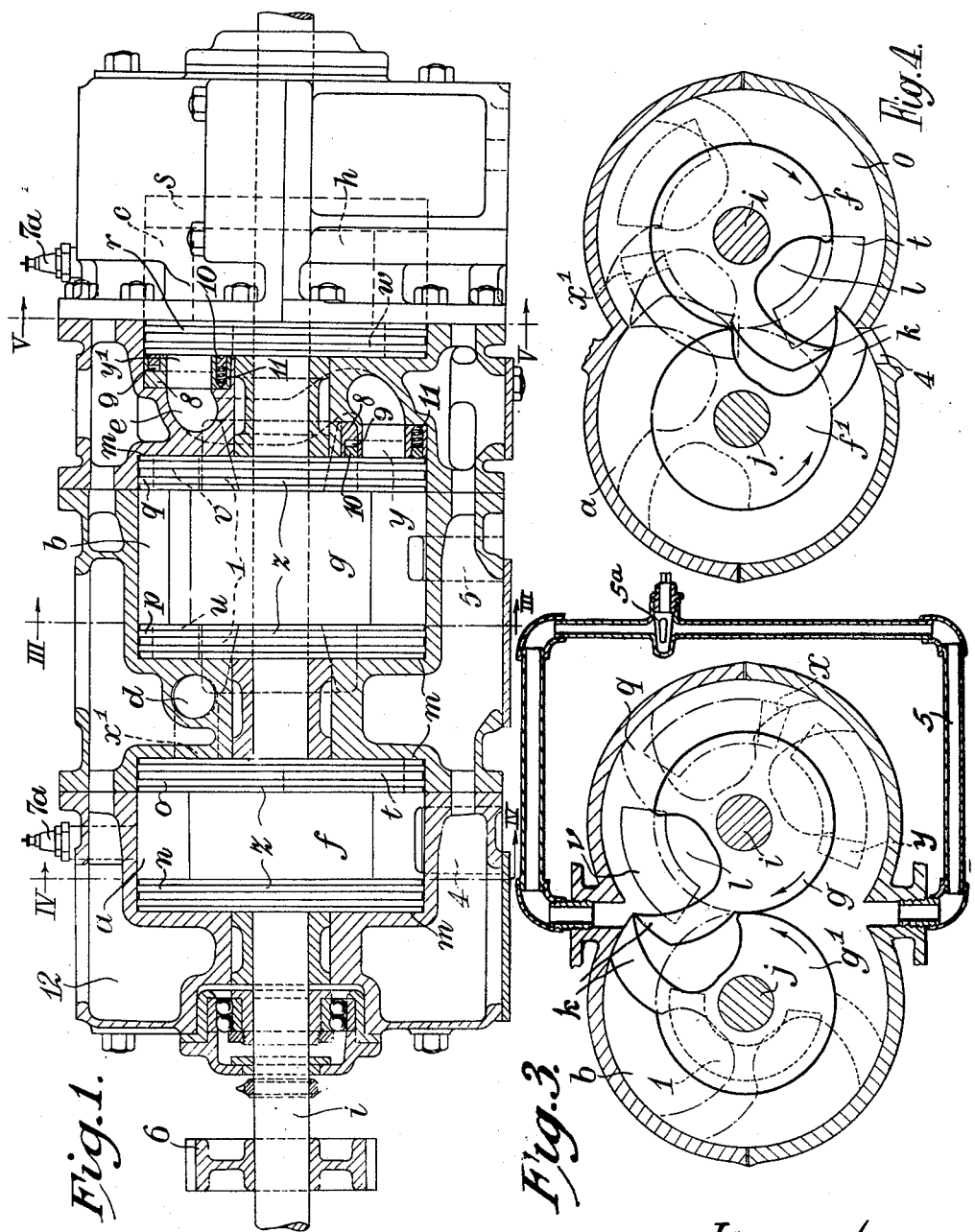
Inventor.
Arthur John Northey,
By Charles A. Morton
Att'y

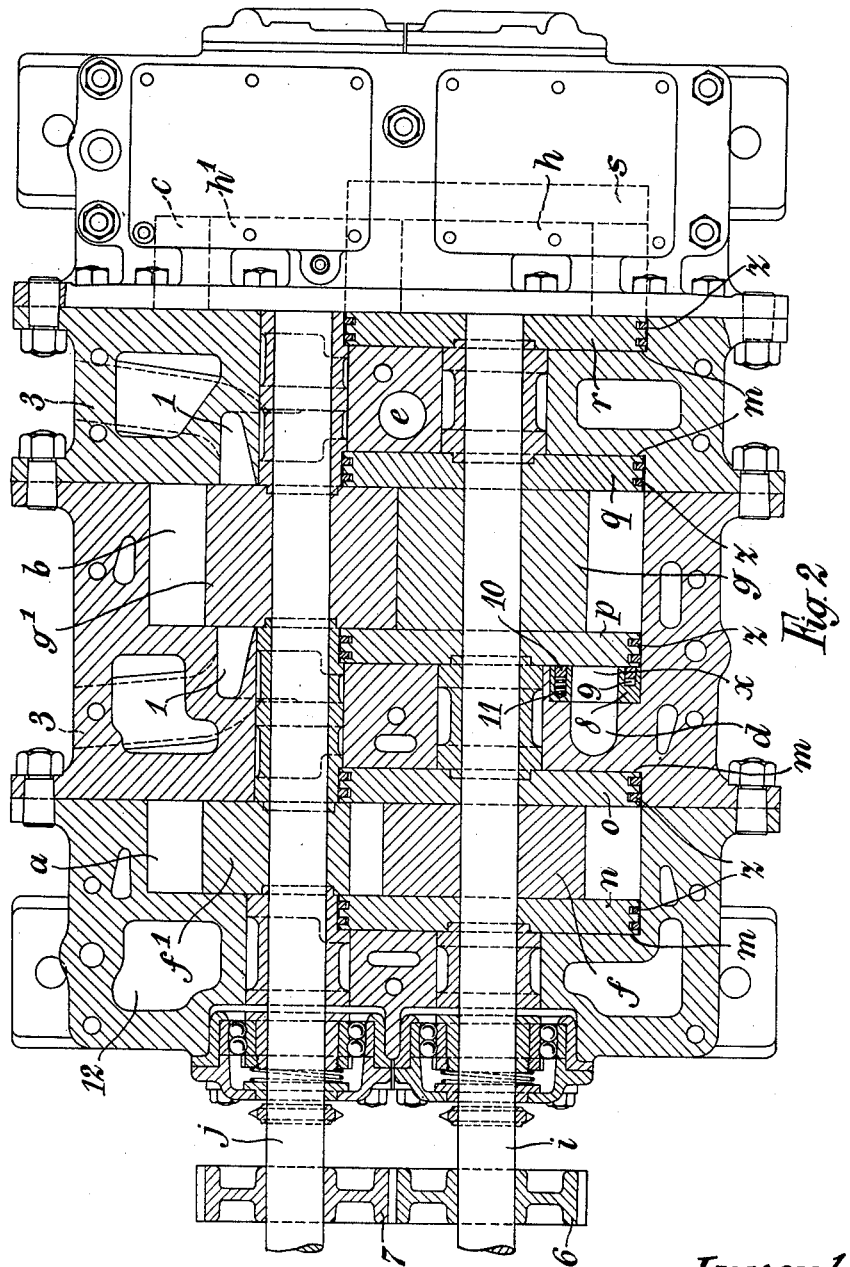

Oct. 27, 1936.  A. J. NORTHEY  2,058,817
ROTARY INTERNAL COMBUSTION ENGINE
Filed Dec. 22, 1932   5 Sheets-Sheet 3
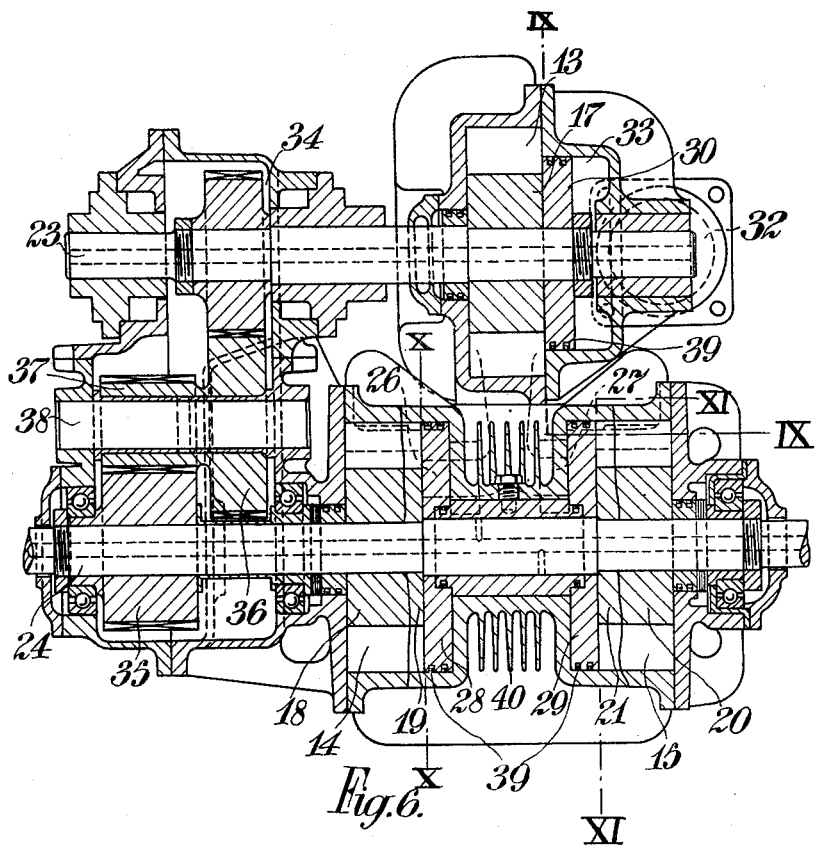
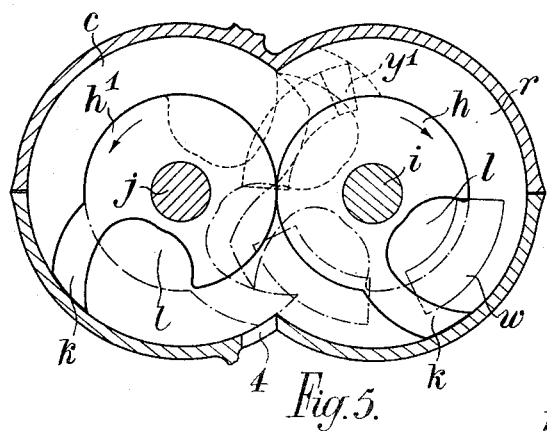
Inventor,
Arthur John Northey.
By Charles A. Morton
Att'y Oct. 27, 1936.     A. J. NORTHEY     2,058,817
ROTARY INTERNAL COMBUSTION ENGINE
Filed Dec. 22, 1932     5 Sheets-Sheet 4

Inventor,
Arthur John Northey.
By Charles A. Morton
Att'y

Oct. 27, 1936.   A. J. NORTHEY   2,058,817
ROTARY INTERNAL COMBUSTION ENGINE
Filed Dec. 22, 1932   5 Sheets-Sheet 5
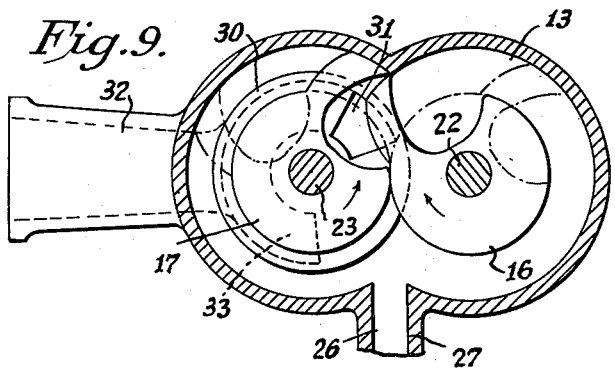
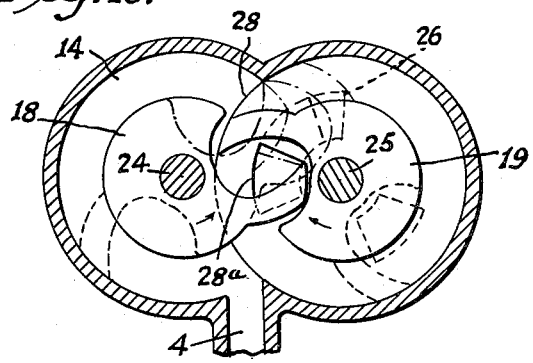
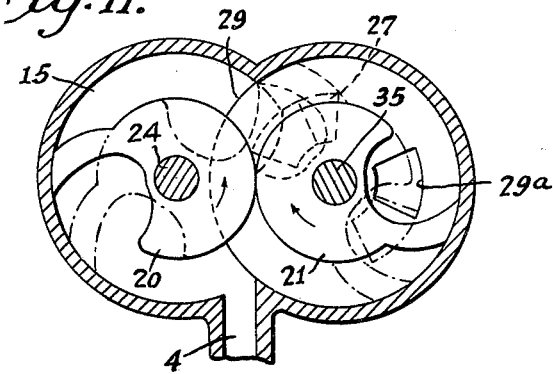
Inventor:
Arthur John Northey.
By Charles A. Morton
Att'y Patented Oct. 27, 1936

2,058,817

UNITED STATES PATENT OFFICE 2,058,817

ROTARY INTERNAL COMBUSTION ENGINE

Arthur John Northey, Parkstone, England, assignor to Northey Rotary Engines Limited, Townsville, Australia Application December 22, 1932, Serial No. 648,486
In Great Britain December 22, 1931

3 Claims. (Cl. 123—12)

This invention relates to rotary internal combustion engines of the rotary type comprising one or more working cylinders fed with fuel or atmospheric air from a compressor.

An internal combustion engine of the above type is already disclosed in my prior United States Patent No. 1,923,500, August 22, 1933, according to which three double chambers are arranged one behind the other and each provided with a pair of coacting pistons, one pair of which serves for compressing combustible mixture whilst the remaining pistons are driven by the combustion of the said mixture, the compression chamber being arranged between the explosion chambers. Passages are provided one on either side of the compression chamber and leading from the latter to the first and second explosion chambers respectively, one passage being disposed in advance of the other. Ported discs are arranged one at each end of the said passages and fixed to one piston of each pair, the said discs opening first one passage and then the other to permit a charge of mixture to be transferred from the compression chamber to first one explosion chamber and then the other, each charge being fired in turn so that two impulses are imparted to the engine for each revolution.

It has been found in practice that in the rotary engine constructed according to my prior United States Patent 1,923,500 above referred to, there is a tendency for the charge of air or mixture to sustain a loss of pressure when being discharged from the compressor through the communicating passages into the respective explosion chambers, and the present invention has for its object to overcome this disadvantage.

A further object of the invention is to so arrange the compression chamber relative to the explosion chambers as to not only reduce the length of the communicating passages therebetween to a minimum but also to permit their assembly being varied to suit limitations of space such as when used for driving an automobile or like vehicle.

The invention consists in a rotary internal combustion engine of the type referred to and having three double chambers each provided with a pair of co-acting pistons, one pair of which serves for compressing combustible mixture whilst the remaining pairs of pistons are driven by the combustion of the said mixture, and also passages leading from the compression chamber to each of the explosion chambers, as well as ported discs arranged one at each end of the said passages and fixed to one piston of each pair, the said discs opening first one passage and then the other to permit a charge of air or mixture to be transferred from the compression chamber to first one explosion chamber and then the other so that two impulses are imparted to the engine for each revolution, the provision of means whereby the air or mixture in the compressor is maintained at full compression pressure during the transfer of the charge from the said compressor to the working cylinders.

The invention will now be described with reference to the accompanying drawings, in which:—

Figure 1 is a part sectional elevation of a rotary internal combustion engine constructed according to the invention, Figure 2 a part sectional plan thereof with the top half of the engine removed, Figure 3 a cross-section through the compression chamber taken on the line III—III looking in the direction of the arrows and showing three positions of the compression rotors during one complete cycle.

Figure 4 a similar section through one of the explosion chambers, on the line IV—IV, showing the corresponding positions of the rotors therein.

Figure 8:
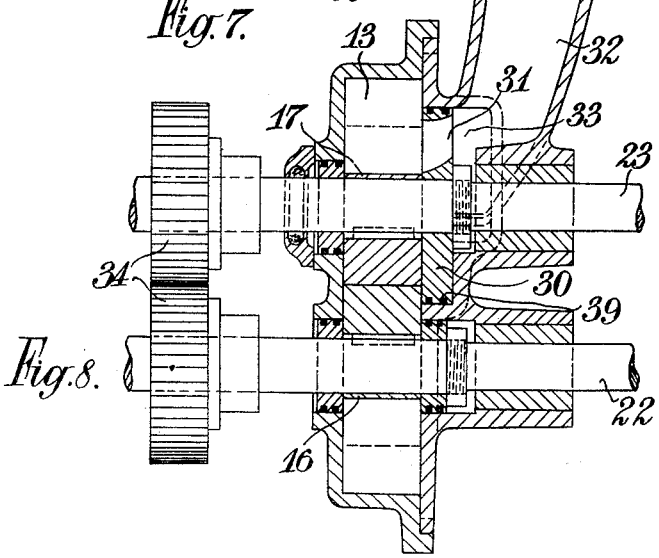

Figure 5 a similar section through the other explosion chamber, on the line V—V, showing the corresponding positions of the rotors in this chamber, Figure 6 a sectional elevation of a modified form of the engine, Figure 7 a sectional plan thereof taken through the explosion chambers, Figure 8 a similar view to Figure 7 taken through the compression chamber, Figure 9 a cross section through the compression chamber taken on the line IX—IX of Figure 6 looking in the direction of the arrows and showing two positions of the compression rotors, Figure 10 a similar section through one of the explosion chambers, on the line X—X showing three positions of the working rotors, and Figure 11 a similar section through the other explosion chamber, on the line XI—XI showing the corresponding positions of the rotors in the other explosion chamber.

In carrying the invention into effect according to the embodiment illustrated in Figures 1 to 5, there are arranged side by side three chambers $a$, $b$ and $c$, one compression and two explosion each being in the form of a double chamber somewhat like that of an ordinary gear pump, that is, each half of such double chamber is a partial cylinder.

The compression chamber $b$ is connected to the explosion chambers *a* and *c*, placed on either side thereof, by means of passages *d* and *e* which lead from the compression chamber to the explosion chambers, and in order to avoid any loss in pressure that might be caused by the passages between the compressor and the explosion chambers the capacity volume of the compressor *b* is in excess of that of either one of the explosion chambers *a* and *c*. For example, the compression chamber may have a capacity which is one and a half times or twice that of either of the explosion chambers.

Within each of these double chambers *a, b* and *c* there is provided a pair of rotors *f* and *f'*, *g* and *g'*, *h* and *h'* carried on parallel shafts *i* and *j* and secured thereto by keys or other suitable means, the rotors being of a diameter to give a predetermined area between same and the wall of the chamber, and each having a smooth peripheral surface.

The rotors *f* and *f'*, *g* and *g'*, *h* and *h'* are each formed with a blade *k*, which projects outward to make a sliding fit against the inner wall and sides of the double chambers *a, b* and *c*. Recesses or pockets *l* are formed on the peripheries of each rotor to enable the blades *k* to perform a complete revolution. The rotors in the compression chamber *b* are arranged the opposite way to those in the explosion chambers *a* and *c*.

The rotors *f, g* and *h* of each pair are provided with discs on the sides thereof mounted within cylindrical recesses *m* provided in the walls of the chambers *a, b* and *c*, the rotor *f* having a pair *n* and *o*, the rotor *g* a pair *p* and *q*, and the rotor *h* a pair *r* and *s*. Piston rings *z* are preferably provided on the peripheries of the discs in order to obtain a gas-tight joint.

The discs *o, p, q, r* are provided with ports *t, u, v* and *w* respectively, which ports are similar in shape and are disposed in the same position relative to their respective rotor blades. The remaining discs *n* and *s* are merely provided for sealing the explosion chambers and no ports are formed therein. The ports *u* and *v* in the discs *p* and *q* on either side of the compression rotor *g* are arranged opposite one another and control the opening and closing of ports *x* and *y* leading from the compression chamber into the communicating passages *d* and *e* respectively. The opposite ends of said passages *d* and *e* are controlled by the discs *t* and *w* which open and close ports *x'* and *y'* leading from said passages into the explosion chambers *a* and *c* respectively.

The ports *t, u, v* and *w* in the discs and the ports *x, x', y, y'* in the walls of the chambers are of such relative area as will enable the latter to remain open a predetermined period and thus allow of a proper transfer of the compressed gas from the compression chamber *b* to the explosion chambers *a* and *c*. The ports in the disc and wall of the explosion chamber *a* are in advance of those in the other explosion chamber *c*, so that compressed gas is transferred from the compression chamber first to one explosion chamber and then to the other.

Ports 1 are provided in the walls of the compression chamber on either side of the compression rotor *g'*, which ports are opened and closed by the said rotor and communicate, through the conduits 3, with the carburetor. Exhaust takes place through the passage 4 provided at the bottom of each explosion chamber, and a by-pass 5 connects the bottom of the compression chamber with the top thereof, which by-pass can be opened by means of the cock 5ª, for throttling the engine, so as to allow a quantity of the mixture to pass from the compression sides of the blades to the induction side, thus reducing the degree of compression of the gas which passes to the explosion chambers. This renders it unnecessary to throttle the carburetor and consequently avoids the creation of a partial vacuum.

The drive is transmitted through the pinions 6 and 7 provided on the rotor shafts *i* and *j* and engaging one with the other so as to ensure synchronous rotation of each pair of rotors.

A sparking plug 7ª is fitted at the top of each explosion chamber.

In order to prevent any leakage of gas when a charge of mixture is being delivered from the compression chamber to either of the explosion chambers, there is provided at both ends of each of the passages *d* and *e* a cage 8 having an annular groove 9 in its side face immediately adjacent the disc of the explosion rotor. Within the groove 9 there is arranged a ring 10 which is pressed against the explosion rotor disc by a spring 11, thereby ensuring an effective sealing means. The engine is provided with a water jacket 12.

The operation of the engine will now be described with reference more particularly to Figures 3, 4 and 5.

In the position shown in full lines in Figure 3, the blades *k* of the compression rotors *g, g'* are about to separate in the direction of the arrows, thus drawing in the fuel or mixture through the ports 1 which are uncovered by the rotor *g'* during this part of its rotational movement. At the same time, fuel or mixture in front of the blades which has previously been admitted, is compressed. During this phase of the cycle, the rotors *f, f'* and *h, h'* in the explosion chambers *a* and *c* are in the positions shown in full lines in Figures 4 and 5 respectively and it will be seen that at this juncture the ports *x, x'* and *y, y'* at either end of the passages *d* and *e* are closed by the discs *o, p, q* and *r* so that no charge of fuel is passing from the compression chamber to either of the explosion chambers.

Further rotation of the compression rotors will bring the blades *k* into the position shown in dot-and-dash lines in Figure 3 in which position the port *u* in the disc *p* of compression rotor *g* is about to uncover the port *x* leading into passage *d* communicating with the explosion chamber *a*. At the same time—as will be seen by referring to Figure 4—rotor *f* in explosion chamber *a* has moved round with its disc *o* into the position shown in dot-and-dash lines so as to bring port *t* into the same position relative to the port *x'* at the other end of passage *d* as port *u* is to port *x*. During this part of the cycle the rotors *h* and *h'* in the explosion chamber *c* have moved round to the position shown in dot-and-dash lines in Figure 5 in which position, it will be noted, the ports *y* and *y'* at either end of the passage *e* are still closed by the discs *q* and *r*.

Continued rotation of the rotors *f* and *g* will cause the ports *x* and *x'* to be opened simultaneously by the ports *t* and *u* thus allowing the compressed gas to pass along the passage *d* into the explosion chamber *a* between the blades of the rotors *f* and *f'*. During such transference of the charge there is no loss in efficiency, owing to the relatively large capacity of the compression chamber *b*, which is displacing more gas than any one explosion chamber is accepting. The ports $x$ and $x'$ remain open for a predetermined period whilst the ports $t$ and $u$ are passing over them, after which they are closed by the discs $o$ and $p$, the positions of the rotors $f$, $f'$ and $g$, $g'$ at this part of the cycle being shown in dotted lines in Figures 3 and 4 respectively. As soon as the explosion chamber $a$ is cut off from the compression chamber the mixture in the former is immediately fired, the resultant explosion driving the rotors $f$ and $f'$ in opposite directions.

As will be seen from Figure 5 up to this moment the communicating passage $e$ has remained closed by the discs $q$ and $r$, but as soon as the ports communicating with explosion chamber $a$ are closed and the mixture fired, the ports on the other side of the compression chamber are opened to allow a charge of compressed gas to pass through the passage $e$ to the explosion chamber $c$. From this point onwards, as will be seen from the position of the rotors in dotted lines in Figures 3 and 5, the ports $v$ and $w$ in the discs $q$ and $r$ start uncovering the ports $y$ and $y'$ at each end of the passage $e$, and a charge of mixture to be discharged into the explosion chamber $c$ between the blades of the working rotors $h$ and $h'$. The ports $y$ and $y'$ are then closed by their respective discs $q$ and $r$, and the mixture immediately fired. Further rotation of the compression rotors brings them once again into the position shown in full lines in Figure 3 whence the cycle of operations is repeated. It will be noted that during the period between the firing of the second charge and the completion of the cycle, the mixture inlet ports $l$ are closed.

With this cycle two impulses are given for each revolution. In the compression chamber, induction and compression take place simultaneously, and in one explosion chamber, expansion, scavenging and exhaust take place simultaneously, to be followed by simultaneous expansion, scavenging and exhaust in the other explosion chamber.

It will be understood that the compression rotors as they turn inwards towards one another, after the second charge of mixture has been transferred, and again interengage ready to commence a new suction charge, there is a period at which both sides of the blades $k$ are in open communication. Also it will be understood that at the conclusion of the transfer to the explosion chamber $c$ there is a pocket of gas remaining under pressure between the blades $k$ of the compression rotors which is at the final compression pressure.

Immediately after this, the pocket is opened by the rotation of the parts and the compressed charge may then flow out onto the other sides of the two compression rotors and which spaces are only at atmospheric pressure.

The escaping compression is immediately balanced by expanding out into the atmospheric air spaces leaving a balanced overall pressure above atmosphere. With such a balanced pressure, the rotors continue their movement and again start to move relatively apart and it will be seen that at this moment, which is the commencement of the compression stroke, there is a pressure already in the compression cylinder above atmosphere. The compression therefore starts at a pressure above that of atmosphere and, more important, the suction stroke on the other side of the rotors continues a full suction stroke drawing in atmospheric pressure approximately a full rotation and practically no portion of the stroke is wasted by expansion of air that may have been already compressed.

Not only therefore is the compression chamber efficient as an ordinary compressor, but it has an initial starting compression pressure which is above that of atmosphere and in this sense it may be termed a supercharged compressor.

Referring now to Figures 6, 7, 8, 9, 10 and 11, there is illustrated therein a modified form of engine in which the compression chamber 13, instead of being arranged between and in alignment with the explosion chambers 14 and 15, is disposed outside the said chambers, for example, immediately above, as shown in Figure 6. The compression chamber 13 and explosion chambers 14 and 15 are of similar form to those already described and are provided respectively with pairs of bladed rotors 16 and 17, 18 and 19, 20 and 21 also of similar shape to those shown in Figures 3, 4 and 5, the rotors 16 and 17 being mounted on shafts 22 and 23 and the rotors 18 and 19, 20 and 21 on shafts 24 and 25.

The compression chamber 13 communicates with the explosion chambers 14 and 15 through the ports 26 and 27, which latter are controlled, at their entrance to the explosion chambers, by the discs 28 and 29 each of which has a port 28$^a$ and 29$^a$ respectively similar to those provided in the discs shown in Figures 3 to 5, and disposed at substantially 180° to one another.

The compression rotor 17 is also provided with a disc 30 having a port 31 and adapted to control the fuel inlet from the conduit 32 by opening and closing a port 33 similar in shape to the fuel inlet port 1 shown in Figure 3 and provided in the wall of the compression chamber between the disc 30 and the conduit 32.

At one end of the compression rotor shafts 22 and 23 are mounted a pair of spur wheels 34 which mesh one with the other, a similar pair of gear wheels 35 being mounted upon the explosion rotor shafts 24 and 25. The drive is transmitted between the explosion and compression rotor shafts by the interposition of the gear wheels 36 and 37 which are mounted on a shaft 38 and engage with one of each pair of gears 34 and 35 respectively, the gear ratios being such as to cause the compression rotors to be driven at twice the speed of the explosion rotors.

Piston rings 39 are preferably provided on the peripheries of the discs in order to obtain a gastight joint, and fins 40 formed on the engine casing which in this arrangement is air cooled. Such engine could however be water cooled, as in the previously described arrangement.

The operation of the modified form of engine is similar to that described with reference to the constructional arrangement shown in Figures 1 to 5 and will now be described with reference more particularly to Figures 9, 10 and 11.

In the position shown in full lines in Figure 9, the blades of the compression rotors 16 and 17 are about to separate in the direction of the arrows, thus drawing in the fuel or mixture from the conduit 32 through the port 33 which is now being uncovered by the port 31 in the disc 30, during this part of the rotational movement of the said rotors. At the same time, fuel or mixture in front of the blades which has previously been admitted, is compressed. During this phase of the cycle the rotors 18, 19 and 20, 21, in the explosion chambers 14 and 15 are in the positions shown in full lines in Figures 10 and 11 respectively, and it will be seen that at this juncture the explosion chamber ends of the ports 26 and 27 are closed by the discs 28 and 29 so that no charge of fuel is passing from the compression chamber to either of the explosion chambers.

Further rotation of the compression rotors will bring the blades into the position shown in dot-and-dash lines in Figure 9 in which position the port 28ᵃ in the disc 28 (Figure 10) is about to uncover the explosion chamber end of the passage 26, thus allowing the gas previously drawn in and which is now suitably compressed to pass along the passage 26 into the explosion chamber 14 between the blades of the working rotors 18, 19. During such transference of the charge, there is no loss in pressure, owing to the fact that the compression rotors whilst being of the same dimensions as those in the working cylinders, are however, rotating at twice the speed of the latter. The port 26 remains open for a predetermined period whilst the port 28ᵃ is passing over it, after which it is closed by the disc 28. As soon as the explosion chamber 14 is cut off from the compression chamber 13, the mixture in the former is immediately fired, the resultant explosion driving the rotors 18, 19 in opposite directions. It will be understood that at this point the compression rotors by virtue of their rotating at twice the speed of the working rotors have completed their cycle and are back in their original position shown in full lines in Figure 9.

As will be seen from Figure 11, up to this moment the communicating passage 27 has remained closed by the disc 29, but after the first explosion has taken place and the rotors 18, 19 in No. 1 explosion chamber have reached the position shown in dotted lines (Figure 10), the port 29ᵃ in disc 29 commences to uncover the explosion chamber end of passage 27 and the compression rotors now being again in their dot-and-dash position (Figure 9) a charge of compressed gas is passed through passage 27 between the blades of the rotors 20, 21 (see dotted position Figure 11). After the charge has been admitted, the passage 27 is closed by the disc 29 and the mixture fired, as a result of which the compression and explosion rotors are brought into the full line positions from whence the cycle of operations is repeated. The exhaust gases are discharged through the passages 4.

By running the compressor at twice the engine speed, the volume of the compressor can be relatively reduced, as for instance, if the compressor is of equal volume to that of either of the working cylinders and is running at twice the engine speed, it will be seen that it is displacing gas or fuel at twice the rate that the combustion chamber is making room to receive it.

Also with such an arrangement of rotary engine the compressor is adapted to deliver its charge of air, fuel or mixture into the working cylinders with a minimum loss of pressure and time.

An engine of the kind above described will be compact, relatively light and free from vibration, owing to the elimination of reciprocating parts, such as crank shafts, connecting rods, pistons and the like. Size for size it will be more powerful as its cubical displacement of gas for its size is very great.

I claim:

1. In a rotary internal combustion engine and in combination, an engine cylinder for receiving a working charge of an explosive mixture compressed to working pressure; a rotary compressor comprising a pair of rotors journaled to rotate in opposite directions within the compressor chamber, each rotor comprising a roller having a longitudinally extending blade projecting radially therefrom to form a sliding fit against the inner wall of the compressor chamber, and a concave recess in the surface of the roller adjoining the base of said blade to enable the blade of the complementary roller to pass, the peripheral surfaces of said rollers being otherwise smooth and cylindrical; said rotary compressor being driven by said engine cylinder and being operable to receive a quantity of the mixture on its induction side at atmospheric pressure whilst simultaneously delivering a quantity of said compressed mixture to the engine cylinder intake until after the close of its intake stroke, a valve connection opened during the induction stroke to admit said mixture into the compressor, a valve connection opened during the engine intake stroke to admit a working charge into said engine cylinder, and means operable to return the unused portion of the compressed charge into the induction side of the compressor to augment the charge last induced and to balance the overall pressure of the augmented charge at a pressure above atmosphere before compressing it, comprising a by-pass momentarily formed as said twin blades after passing each other simultaneously break seal with their complementary recesses whilst said valves are retained in closed position.

2. In a rotary internal combustion engine and in combination, a plurality of working cylinders, each cylinder being operable in cyclic order to receive a working charge of an explosive mixture compressed to working pressure; a rotary compressor comprising a pair of rotors journaled to rotate in opposite directions within the compressor chamber, each rotor comprising a roller having a curved blade extending along the roller from end to end and projecting radially therefrom to form a sliding fit against the inner wall of the compressor chamber, and a concave recess in the surface of the roller at the base of the blade to enable the blade of the complementary roller to pass, the surfaces of the rollers being otherwise smooth and cylindrical; said rotary compressor being driven by said cylinders and being operable to receive a quantity of said mixture on its induction side at atmospheric pressure whilst simultaneously making a quantity of said mixture compressed to working pressure available to said working cylinders in timed succession until after the end of their intake strokes; a valve operable during the induction charge to admit said mixture into the compressor; a plurality of valves, one for each working cylinder, operable under control of the compressor in timed sequence to admit working charges compressed to working pressure in said working cylinders in succession; and means operable to return the unused portion of the compressed charge into the induction side of the compressor to augment the charge last induced and to balance the overall pressure of the augmented charge at a pressure above atmosphere before compressing it, comprising a by-pass momentarily formed as said oppositely rotating blades after passing each other simultaneously break seal with their complementary recesses whilst said valves are retained in closed position.

3. In a rotary internal combustion engine and in combination, two rows of frusto-cylindrical bores arranged to form three chambers each conforming to the contour of axially parallel intersecting twin cylinder bores, including a plurality of engine cylinders and a compressor chamber positioned therebetween, said chamber having a capacity in excess of the capacity of either of the engine cylinders; two shafts, one common to each row of bores, said shafts being geared to rotate in opposite directions; a series of pairs of rotors, one pair for each chamber, said rotors being secured to said shafts, each rotor including a roller, a curved blade projecting radially from the roller and forming a sliding fit against the inner wall of the chamber, a concave recess in each roller to enable the rotating blade of the complementary roller to pass, said compressor rotors being operable under power furnished by said engine cylinders to draw a charge of an explosive mixture into the induction side of said compressor at atmospheric pressure whilst simultaneously compressing a quantity of said mixture to working pressure and making the same available to the engine cylinders in timed succession until after the end of their respective intake strokes; a rotary valve operable during the induction charge under control of one of said shafts to admit said mixture into the compressor; a plurality of other rotary valves, one for each engine cylinder, operable in timed sequence during the compression stroke, to allow said engine cylinders to be successively filled; and means operable to return the unused portion of the compressed charge into the induction side of the compressor to augment the charge last induced and to balance the overall pressure of the augmented charge at a pressure above atmosphere before compressing it, comprising a by-pass momentarily formed between the blades of the compressor rotors as they simultaneously break seal with their complementary recesses after passing one another, whilst all of said valves are held in closed position.

ARTHUR JOHN NORTHEY.